United States Patent
Zi et al.

(10) Patent No.: US 10,246,276 B2
(45) Date of Patent: Apr. 2, 2019

(54) CABLE-STRUT COMBINATION DRIVEN PARALLEL ROBOTIC PALLETIZER

(71) Applicant: Hefei University of Technology, Baohe Hefei (CN)

(72) Inventors: Bin Zi, Baohe Hefei (CN); Bingyao Wang, Baohe Hefei (CN); Guangcai Yin, Baohe Hefei (CN); Hao Liu, Baohe Hefei (CN)

(73) Assignee: Hefei University of Technology (CN)

( * ) Notice: Subject to any disclaimer, the term of this patent is extended or adjusted under 35 U.S.C. 154(b) by 66 days.

(21) Appl. No.: 15/122,774

(22) PCT Filed: Feb. 11, 2015

(86) PCT No.: PCT/CN2015/072732
§ 371 (c)(1),
(2) Date: Aug. 31, 2016

(87) PCT Pub. No.: WO2016/106962
PCT Pub. Date: Jul. 7, 2016

(65) Prior Publication Data
US 2017/0174450 A1 Jun. 22, 2017

(30) Foreign Application Priority Data
Dec. 29, 2014 (CN) .......................... 2014 1 0835849

(51) Int. Cl.
*B65G 61/00* (2006.01)
*B25J 9/08* (2006.01)
(Continued)

(52) U.S. Cl.
CPC ............ *B65G 61/00* (2013.01); *B25J 9/0021* (2013.01); *B25J 9/0078* (2013.01); *B25J 9/04* (2013.01);
(Continued)

(58) Field of Classification Search
CPC .............................. B65G 61/00; B65G 57/03; B65G 2201/0223; B25J 9/04; B25J 9/1065;
(Continued)

(56) References Cited

U.S. PATENT DOCUMENTS 4,666,362 A * 5/1987 Landsberger .......... B25J 9/0078
212/239
4,978,274 A * 12/1990 de Groot .................. B25J 9/042
414/744.3
(Continued)

FOREIGN PATENT DOCUMENTS

| CN | 101870102 | 10/2010 |
|---|---|---|
| CN | 201619887 | 11/2010 |
| CN | 203901283 | 10/2014 |
| WO | 2014041318 | 3/2014 |

OTHER PUBLICATIONS

International Search Report re PCT/CN2015/072732, dated Oct. 10, 2015, 4 pgs.

*Primary Examiner* — Victor L MacArthur
(74) *Attorney, Agent, or Firm* — Greenberg Traurig, LLP

(57) ABSTRACT

A combined rope-rod-driven parallel palletizing robot, comprises a chassis, wherein, a base driving mechanism is arranged on the chassis, a torque transfer mechanism is mounted on the base driving mechanism, a top gearbox is mounted on the top of the torque transfer mechanism, a gib arm is movably connected to the top gearbox, and a mechanical arm end tool is arranged on the movable end of the gib arm to operate a work object; the robot further comprises three steel wire rope drivers and three corresponding steel wire ropes, the three steel wire rope drivers are located on the chassis and evenly distributed around the base driving mechanism. In the present invention, the top gearbox and the torque transfer mechanism are driven by a (Continued)

rope to execute two-freedom spatial movement, so as to do palletizing work in a bigger work space.

8 Claims, 8 Drawing Sheets

(51) Int. Cl.
- B25J 9/00 (2006.01)
- B25J 9/04 (2006.01)
- B25J 9/10 (2006.01)
- B25J 9/16 (2006.01)
- B65G 57/03 (2006.01)

(52) U.S. Cl.
CPC ............... B25J 9/08 (2013.01); B25J 9/102 (2013.01); B25J 9/104 (2013.01); B25J 9/1065 (2013.01); B25J 9/1615 (2013.01); B65G 57/03 (2013.01); B65G 2201/0223 (2013.01)

(58) Field of Classification Search
CPC . B25J 9/104; B25J 9/102; B25J 9/0078; B25J 9/0021; B25J 9/08; B25J 9/1615
See application file for complete search history.

(56) References Cited

U.S. PATENT DOCUMENTS

| | | | | |
|---|---|---|---|---|
| 6,095,011 | A * | 8/2000 | Brogårdh | B25J 9/1065 74/490.03 |
| 7,828,162 | B2 * | 11/2010 | Wiesbauer | B66C 23/185 212/238 |
| 8,621,954 | B1 * | 1/2014 | Dellon | 74/490.01 |
| 9,314,934 | B2 * | 4/2016 | Whitney | B25J 19/002 |
| 2004/0146388 | A1 * | 7/2004 | Khajepour | B25J 17/0266 414/680 |
| 2004/0250644 | A1 * | 12/2004 | Gosselin | B25J 9/04 74/490.04 |
| 2005/0150854 | A1 * | 7/2005 | Toudou | B66C 23/344 212/175 |
| 2010/0111645 | A1 * | 5/2010 | Al-Mouhamed | B25J 9/104 901/21 |
| 2010/0272552 | A1 | 10/2010 | Xu et al. | |
| 2010/0300230 | A1 * | 12/2010 | Helmer | B25J 9/106 74/469 |
| 2011/0206481 | A1 * | 8/2011 | Al-Mouhamed | B25J 9/104 901/21 |
| 2012/0221146 | A1 * | 8/2012 | Zhang | B25J 9/0078 74/490.03 |
| 2014/0079525 | A1 | 3/2014 | Krimpmann | |
| 2014/0290417 | A1 * | 10/2014 | Lukka | B25J 9/0078 74/490.04 |

* cited by examiner

CABLE-STRUT COMBINATION DRIVEN PARALLEL ROBOTIC PALLETIZER

CROSS REFERENCE TO RELATED APPLICATION

The present application is a 371U.S. National Stage of International Application No. PCT/CN2015/072732, filed Feb. 11, 2015, which claims the benefit of the earlier filing date of Chinese Patent Application No. 201410835849.0filed on Dec. 29, 2014, which are each incorporated herein by reference in their entirety.

FIELD OF THE INVENTION

The present invention relates to industrial robot, in particular to a combined rope-rod-driven parallel palletizing robot.

BACKGROUND ART

As the mechanical automation level is improved, palletizing robots are applied more and more widely in automatic handling operation fields, such as machine baiting, automatic assembly lines, handling and palletizing, and container handling, etc. Palletizing robots that are used extensively at present are serial palletizing robots, represented by articulated palletizing robots. For example, articulated palletizing robots have advantages such as compact structure, high action agility, and small floor area, etc.; however, open-chain serial palletizing robots have drawbacks such as high robot arm weight, large inertia, and accumulative joint error, etc., and cannot meet the requirement for working under heavy load at a high speed.

SUMMARY

In view of the defects and drawbacks in serial palletizing robots, the present invention provides a combined rope-rod-driven parallel palletizing robot. In the present invention, all driving motors are mounted on a chassis; therefore, the problems of existing palletizing robot mechanisms in which the motors are mounted at the hinges, such as heavy arm and large inertia, etc., can be solved; in addition, the present invention employs a parallel flexible rope mechanism, which avoids the problems in conventional open-chain serial palletizing robots, such as poor rigidity and joint error accumulation, etc.

The technical scheme employed in the present invention is as follows:

A combined rope-rod-driven parallel palletizing robot, comprising a chassis, wherein, a base driving mechanism is arranged on the chassis, a torque transfer mechanism is mounted on the base driving mechanism, a top gearbox is mounted on the top of the torque transfer mechanism, a gib arm is movably connected to the top gearbox, and a mechanical arm end tool is arranged on the movable end of the gib arm to operate a work object; the robot further comprises three steel wire rope drivers and three corresponding steel wire ropes, wherein, the three steel wire rope drivers are located on the chassis and arranged evenly around the base driving mechanism, the base mechanism comprises a base-driving internal torque structure and a base-driving external torque structure, the base-driving internal torque structure and the base-driving external torque structure are driven by driving motors to generate internal torque and external torque respectively, the steel wire ropes pass through the base-driving external torque structure, the torque transfer mechanism, and the top gearbox to the steel wire rope drivers, the steel wire rope drivers drive the steel wire ropes to transfer the external torque to the top gearbox, the internal torque is transferred via the torque transfer mechanism to the top gearbox, and is converted by the top gearbox to drive the forearm to rotate and lift; thus, the robot is combined driven by ropes and rods, so that the entire robot performs handling and palletizing actions.

The base driving mechanism comprises a base, a base internal torque output shaft is arranged above the base, and a base external torque transfer shaft is arranged below the base; the upper part of the base external torque transfer shaft is fixed in the base, and the lower part of the base internal torque output shaft is fixed in the base external torque transfer shaft; the base internal torque output shaft is mounted with a gear B thereon, and comprises a driving motor A, a gear A is arranged on the output shaft of the driving motor A, the gear A engages with the gear B, and the driving motor A drives the base internal torque output shaft via the gear A and the gear B;

A base torque output disk is fixedly mounted below the base external torque transfer shaft; the base external torque transfer shaft is mounted with a gear D thereon, and comprises a driving motor B mounted on one side of the base, a gear C is arranged on the output shaft of the driving motor B, the gear C engages with the gear D, the driving motor B drives the base external torque transfer shaft via the gear C and the gear D, and the base external torque transfer shaft drives the base torque output disk mounted below it;

The base internal torque output shaft and the base external torque output shaft rotate coaxially and independently without interference between them; according to the working environment for conventional handling and palletizing work, the angle between the axes of the two torque output shafts of the base driving mechanism and horizontal plane are 45°, so as to maximize the utilization of the work space.

The torque transfer mechanism comprises an intermediate shaft with two universal couplings, wherein, universal coupling I and universal coupling II are arranged on the lower part and upper part of the intermediate shaft, the other end of the lower universal coupling I is connected to the base internal torque transfer shaft, the other end of the upper universal coupling II is connected to a torque input shaft of the top gearbox, so as to transfer the internal torque of the base internal torque transfer shaft upwards along the intermediate shaft with two universal couplings.

The top gearbox comprises a gearbox casing, a gearbox torque input mechanism in the gearbox casing, a gearbox upper torque output mechanism, and a gearbox lower torque output mechanism;

The gearbox torque input mechanism comprises a gearbox torque input shaft and a gearbox torque input disk, wherein, the gearbox torque input shaft is fixed in the gearbox torque input disk; the gearbox torque input disk is arranged with a bronze wear ring and a spacing ring for bronze wear ring, the spacing ring for bronze wear ring limits the bronze wear ring to the gearbox torque input disk, leaving only one degree of freedom for the bronze wear ring to rotate around the axis of the gearbox torque input disk; the gearbox casing is fixedly connected with the bronze wear ring;

Six steel wire rope knuckle bearings I and steel wire rope knuckle bearings II are mounted evenly on the base torque output disk and the gearbox torque input disk respectively, the steel wire rope knuckle bearings I are fixed to the base torque output disk via knuckle bearing end caps, and the knuckle bearing end caps are fixed by bearing end cap fixing screws; a steel wire rope connection clamp is arranged in the steel wire rope knuckle bearing I, and the torque transfer steel wire rope is mounted to a steel wire rope end knuckle bearing via the steel wire rope connection clamp; the steel wire rope connection clamp is tapered, so that it utilizes deformation to clamp the torque transfer steel wire rope automatically; the mounting of the steel wire rope knuckle bearings II on the gearbox torque input disk and the internal setting of the steel wire rope knuckle bearings II are the same as those of the steel wire rope knuckle bearings I; the two ends of six torque transfer steel wire ropes are mounted into the steel wire rope knuckle bearings I and the steel wire rope knuckle bearings II respectively; when the base torque output disk is driven by the driving motor B to rotate, the torque transfer steel wire rope will rotate along the base torque output disk, so as to accomplish upward transfer of the external torque.

The centers of spheres of the steel wire rope knuckle bearings I and the steel wire rope knuckle bearings II are in the same plane, to keep the torque transfer steel wire rope in vertical direction; in addition, the center points of the universal coupling I and the universal coupling II are in the same plane as the centers of spheres of the steel wire rope knuckle bearings I and the steel wire rope knuckle bearings II respectively, to meet the geometric requirement of the movement of the mechanism.

The gearbox lower torque output mechanism comprises a gearbox lower torque output shaft, two through-holes are drilled in the lower part of the gearbox lower torque output shaft to mount a forearm and an ancillary forearm;

The gearbox upper torque output mechanism comprises a top gearbox upper torque output shaft, which is arranged with a steel wire reel thereon;

A bevel gear C is mounted on the gearbox torque input shaft, a bevel gear B is mounted on the gearbox upper torque output shaft, the bevel gear C engages with the bevel gear B, and the torque on the gearbox torque input shaft is transferred via the bevel gear C, the bevel gear B, and the top gearbox upper torque output shaft to the steel wire reel to drive the steel wire reel to rotate.

A bevel gear D is mounted on the gearbox torque input disk, a bevel gear A is mounted on the top gearbox lower torque output shaft, the bevel gear D engages with the bevel gear A, and the torque on the gearbox torque input disk is transferred via the bevel gear D and the bevel gear A to the top gearbox lower torque output shaft to drive the top gearbox lower torque output shaft to rotate.

The gearbox casing is further arranged with a steel wire rope guide device, a steel wire rope positioning device, and three evenly distributed steel wire rope pull rings.

The steel wire rope guide device comprises a steel wire rope guide device mounting base, a hollow rotating shaft, and a pulley block fixing base, wherein, the hollow rotating shaft is fixed on the steel wire rope guide device mounting base, the pulley block fixing base is mounted on the hollow rotating shaft and rotates with the hollow rotating shaft, four evenly distributed tangential pulleys A and steel wire rope limit blocks are mounted on the pulley block fixing base, the pulleys A and the steel wire rope limit blocks are mounted on the pulley block fixing base via pulley fixing bolts, nuts and washers, the rope groove of each pulley A among the four tangential pulleys A is a quadrant, the steel wire rope limit blocks can limit the steel wire rope; when the angle of the steel wire rope is changed, the steel wire rope will apply force on the steel wire rope limit blocks to poke the steel wire rope limit blocks, so that the hollow rotating shaft rotates and the angles of the pulleys A are adjusted to keep consistent with the direction of the steel wire rope.

The gib arm comprises a forearm and an ancillary forearm, the rear ends of the forearm and the ancillary forearm are mounted on the lower part of the top gearbox lower torque output shaft, a wrist driving motor mounting platform is mounted on the front ends of the forearm and the ancillary forearm, and a wrist driving motor is mounted on the wrist driving motor mounting platform; the forearm, the ancillary forearm, and the wrist driving motor mounting platform form a parallelogram, so as to maintain the attitude of the wrist. the front end of the forearm further is connected with steel wire rope, the other end of the steel wire rope passes through a round hole formed by the four tangential pulleys A on the steel wire rope guide device and passes through the hollow rotating shaft, and then passes through a round hole formed by the rope groove of a pulley B, and finally is reeled on the steel wire reel; thus, the gib arm is driven to sway up and down as the steel wire rope is stretched or retracted;

The torque transfer steel wire rope passes through the steel wire rope knuckle bearings II and then passes through the steel wire rope pull rings on the top gearbox, and finally is connected to the steel wire rope driver mounted on the chassis.

The present invention has the following prominent advantages:

1) The top gearbox and the torque transfer mechanism are driven by a rope to execute two-freedom spatial movement, so as to do palletizing work in a bigger work space;

2) The robot has a rope-based parallel mechanism, which has advantages such as high rigidity, high bearing capacity, high safety, low accumulative error, high movement speed, and flexible movement locus;

3) A torque transfer mechanism is utilized to transfer the power device to the base, so that the mass of the moving part of the robot is significantly reduced; thus, the mechanism has low movement inertia, high dynamic performance, and can meet the requirement for high-speed and heavy-duty handling and palletizing;

4) The robot has high dynamic performance, and can meet the requirement for high-speed and heavy-duty handling and palletizing.

In the figures: 1—steel wire rope driver; 2—base driving mechanism; 3—torque transfer mechanism; 4—steel wire rope; 5—top gearbox; 6—gib arm; 7—mechanical arm end tool; 8—work object;

2.1—driving motor A; 2.2—gear A; 2.3—gear B; 2.4—base internal torque transfer shaft; 2.5—driving motor B; 2.6—gear C; 2.7—knuckle bearing end cap; 2.8—bearing end cap fixing screw; 2.9—base torque output disk fixing screw; 2.10—base torque output disk; 2.11—base external torque transfer shaft; 2.12—base;

2.13—shaft check ring A; 2.14—bearing A; 2.15—bearing B; 2.16—shaft check ring B; 2.17—bearing C; 2.18—bearing D;

3.1—intermediate shaft with two universal couplings; 3.2—torque input universal coupling; 3.3—torque transfer steel wire rope; 3.4—steel wire rope end knuckle bearing; 3.5—torque output universal coupling; 3.6—steel wire rope connection clamp;

5.1—bearing E; 5.2—top gearbox lower torque output shaft; 5.3—bearing F; 5.4—bevel gear A; 5.5—steel wire rope guide device; 5.6—steel wire rope positioning device; 5.7—steel wire reel; 5.8—top gearbox upper torque output shaft; 5.9—bearing G; 5.10—bearing H; 5.11—bevel gear B; 5.12—bevel gear C; 5.13—bevel gear D; 5.14—gearbox casing fixing bolt; 5.15—top gearbox casing; 5.16—steel wire rope pull ring fixing screw; 5.17—steel wire rope pull ring hinge; 5.18—steel wire rope pull ring; 5.19—gearbox torque input shaft; 5.20—shaft check ring C; 5.21—bearing I; 5.22—fixing screw for spacing ring for bronze wear ring; 5.23—bearing J; 5.24—spacing ring for bronze wear ring; 5.25—bronze wear ring; 5.26—gearbox torque input disk; 5.27—knuckle bearing end cap; 5.5.1—steel wire rope guide device mounting base; 5.5.2—bearing K; 5.5.3—bearing L; 5.5.4—hollow rotating shaft; 5.5.5—pulley block fixing base; 5.5.6—pulley A; 5.5.7—steel wire rope limit block; 5.5.8—pulley fixing bolt; 5.5.9—nut and washer; 5.5.10—shaft check ring C;

5.6.1—pulley B; 5.6.2—pulley fixing pin shaft; 5.6.3—steel wire rope positioner mounting base;

6.1—wrist driving motor; 6.2—wrist driving motor mounting platform; 6.3—steel wire rope pull ring; 6.4—forearm; 6.5—ancillary forearm.

DETAILED DESCRIPTION

Hereunder the present invention will be further detailed in embodiments, with reference to the accompanying drawings.

Figure 1:
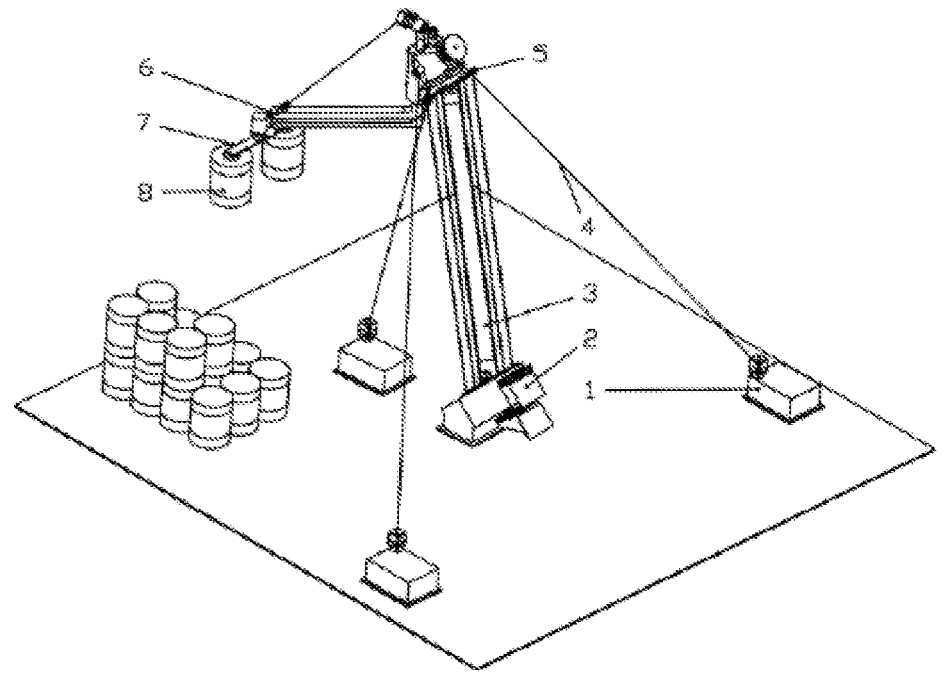
FIG. 1 is an effect drawing of manual operation of the combined rope-rod-driven parallel palletizing robot.
Figure 2:
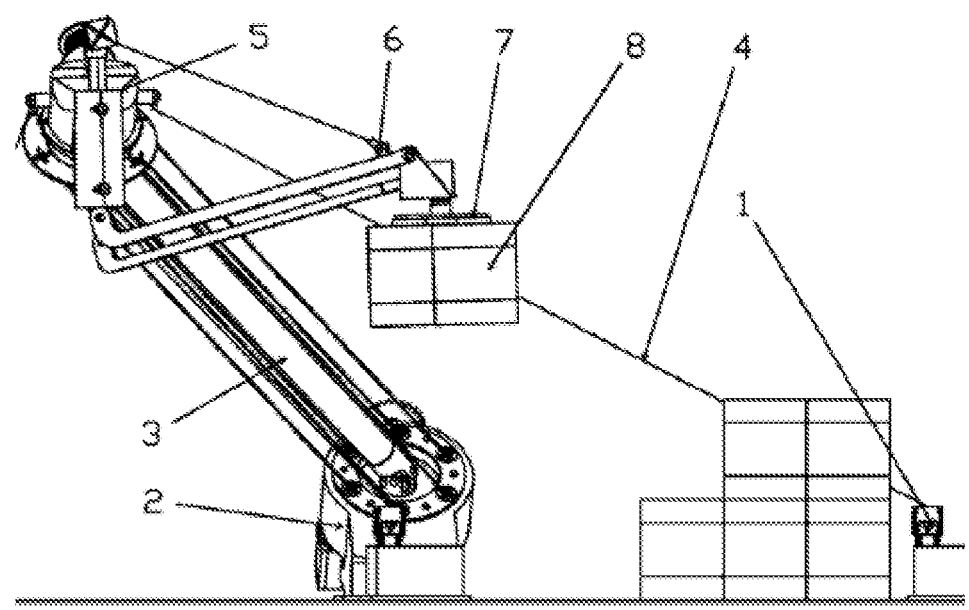
FIG. 2 is an effect drawing of manual operation of the combined rope-rod-driven parallel palletizing robot.

As shown in FIG. 1 and FIG. 2, a combined rope-rod-driven parallel palletizing robot, comprising a chassis, wherein, a base driving mechanism 2 is arranged on the chassis, a torque transfer mechanism 3 is mounted on the base driving mechanism 2, a top gearbox 5 is mounted on the top of the torque transfer mechanism 3, a gib arm 6 is movably connected to the top gearbox 5, and a mechanical arm end tool is arranged on the movable end of the gib arm to operate a work object; the robot further comprises three steel wire rope drivers 1 and three corresponding steel wire ropes 4, wherein, the three steel wire rope drivers 1 are located on the chassis and arranged evenly around the base driving mechanism 2, the base mechanism 2 comprises a base-driving internal torque structure and a base-driving external torque structure, the base-driving internal torque structure and the base-driving external torque structure are driven by driving motors to generate internal torque and external torque respectively, the steel wire ropes pass through the base-driving external torque structure, the torque transfer mechanism 3, and the top gearbox 5 to the steel wire rope drivers; the torque transfer mechanism 3 comprises an external torque transfer mechanism and an internal torque transfer mechanism, the external torque transfer mechanism transfers the torque from the base torque output disk 2.10 to the top gearbox 5 via six steel wire ropes 3.3, the internal torque transfer mechanism transfers the torque from the base internal torque transfer shaft 2.4 to the top gearbox 5, and the torque is converted by the top gearbox 5 so as to drive the forearm 6 to rotate and lift; thus, the robot is combined driven by ropes and rods, so that the entire robot performs handling and palletizing actions.

Figure 3:
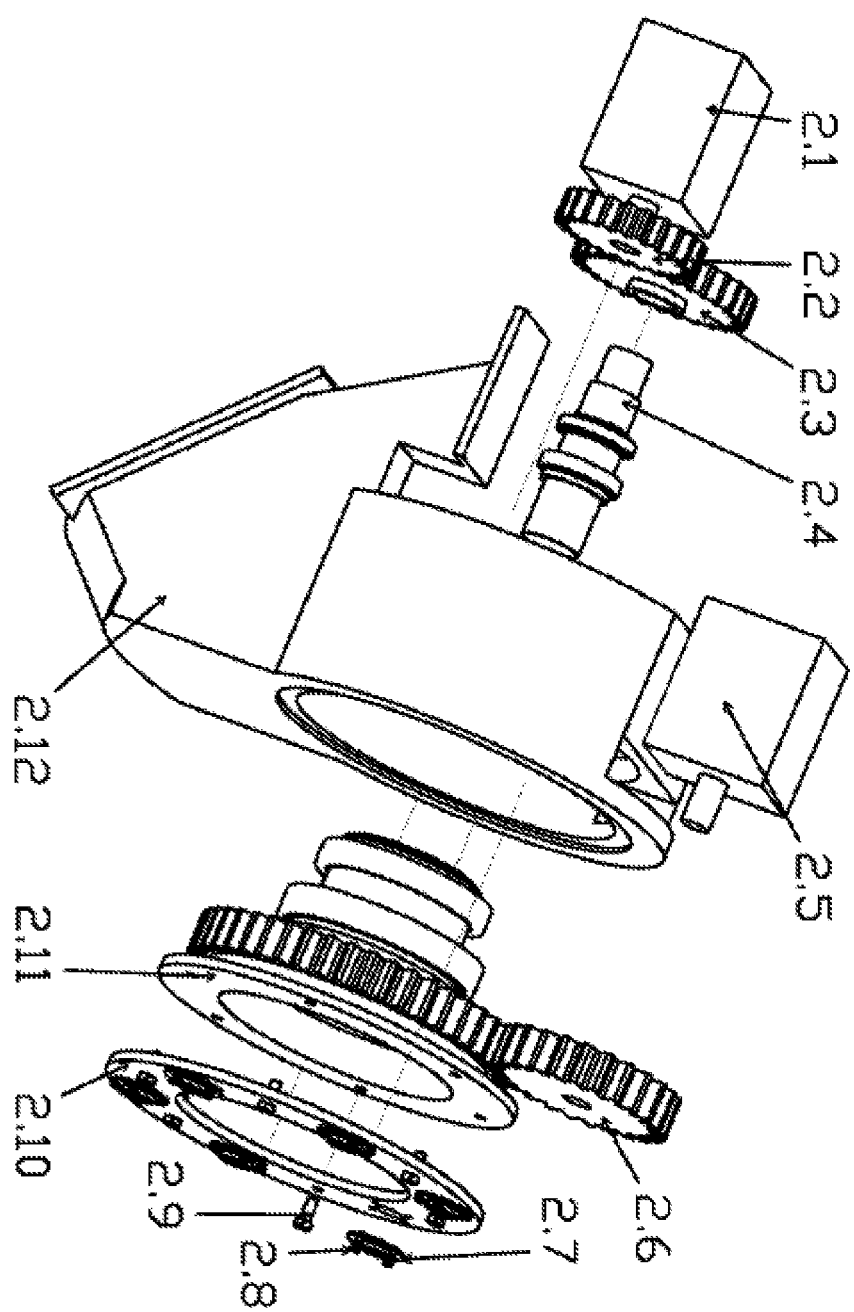
FIG. 3 is an exploded view of the base driving mechanism.
Figure 4:
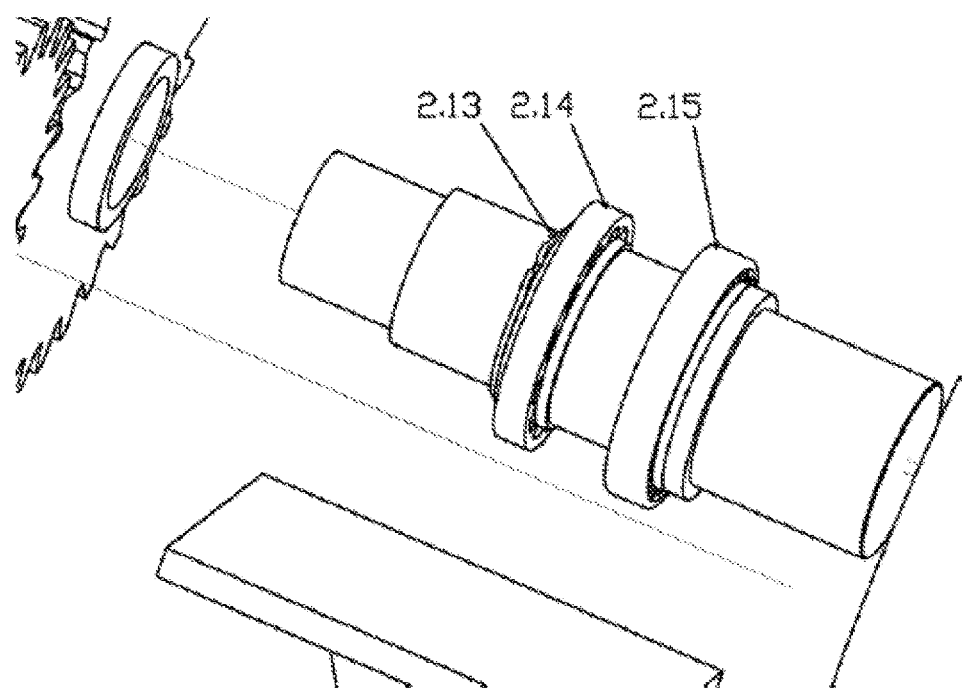
FIG. 4 is a structure diagram of the internal shaft of the base driving part.
Figure 5:
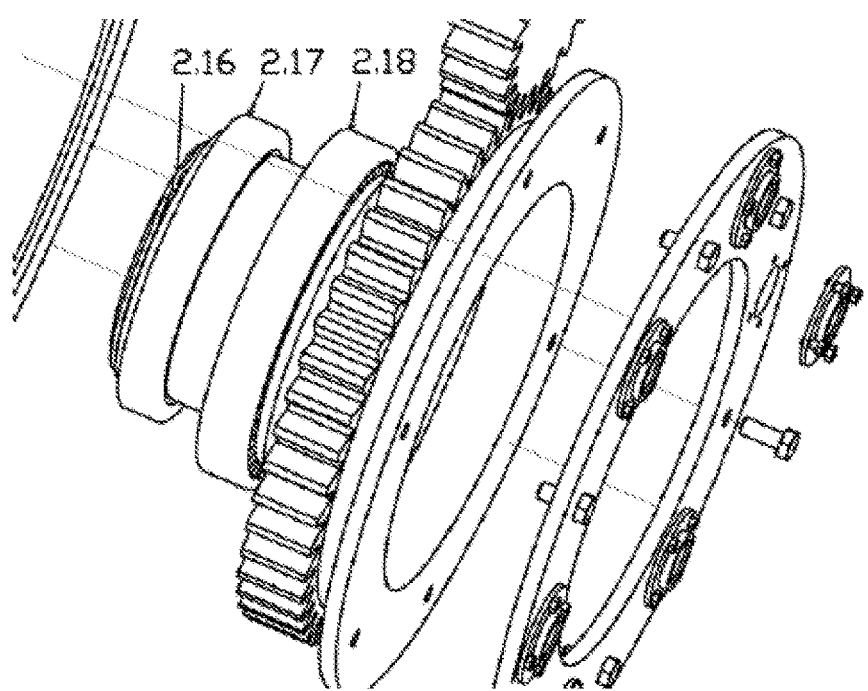
FIG. 5 is a structure diagram of the external shaft of the base driving part.

FIG. 3 is an exploded view of the base driving mechanism according to the present invention. The base driving mechanism 2 comprises a base 2.12, a base internal torque output shaft 2.4 is arranged above the base 2.12, and a base external torque transfer shaft 2.11 is arranged below the base 2.12; the upper part of the base external torque transfer shaft 2.11 is fixed in the base 2.12 via a shaft check ring B 2.16, a bearing C 2.17, and a bearing D 2.18, as shown in FIG. 5; the lower part of the base internal torque output shaft 2.4 is fixed in the base external torque transfer shaft 2.11 via a shaft check ring A 2.13, a bearing A 2.14, and a bearing B 2.15, as shown in FIG. 4; the base internal torque output shaft 2.4 is mounted with a gear B 2.3 thereon, and comprises a driving motor A 2.1, a gear A 2.2 is arranged on the output shaft of the driving motor A 2.1, the gear A 2.2 engages with the gear B 2.3, and the driving motor A 2.1 drives the base internal torque output shaft 2.4 via the gear A 2.2 and the gear B 2.3;

A base torque output disk 2.10 is fixedly mounted below the base external torque transfer shaft 2.11 by bolts 2.9; the base external torque transfer shaft 2.11 is mounted with a gear D thereon, and comprises a driving motor B 2.5 mounted on one side of the base 2.12, a gear C 2.6 is arranged on the output shaft of the driving motor B 2.5, the gear C 2.6 engages with the gear D, the driving motor B 2.2 drives the base external torque output shaft 2.11 via the gear C 2.6 and the gear D, and the base external torque transfer shaft 2.11 drives the base torque output disk 2.10 mounted below it;

The base internal torque output shaft 2.4 and the base external torque output shaft 2.11 rotate coaxially and independently without interference between them; according to the working environment for conventional handling and palletizing work, the angle between the axes of the two torque output shafts of base driving mechanism and horizontal plane are 45°, so as to maximize the utilization of the work space.

Figure 6:
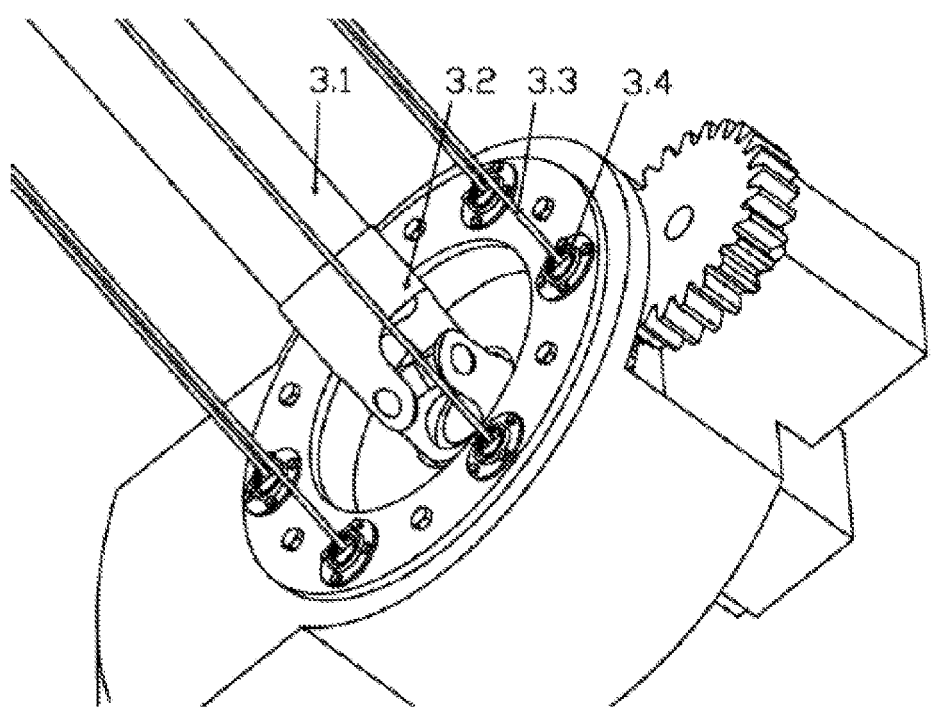
FIG. 6 is a schematic structural diagram of the torque transfer mechanism.

FIG. 6 is a schematic structural diagram of the torque transfer mechanism according to the present invention. The torque transfer mechanism comprises an intermediate shaft 3.1 with two universal couplings, universal coupling I 3.2 and universal coupling II are arranged on the lower part and upper part of the intermediate shaft 3.1, the other end of the lower universal coupling I 3.2 is connected to the base internal torque transfer shaft 2.4, the other end of the upper universal coupling II is connected to a torque input shaft 5.19 of the top gearbox 4, so as to transfer the internal torque of the base internal torque transfer shaft 2.4 upwards along the intermediate shaft 3.1 with two universal couplings.

Figure 7:
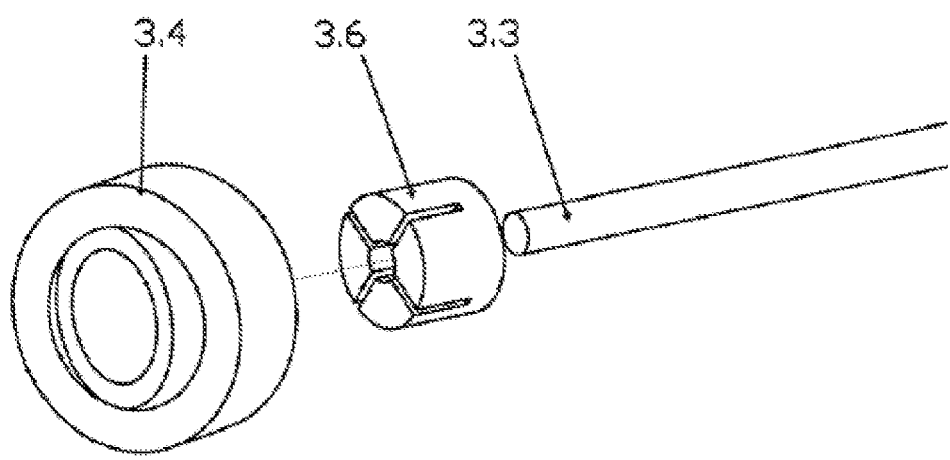
FIG. 7 is a schematic structural diagram of the torque transfer steel wire rope end connection device.
Figure 8:
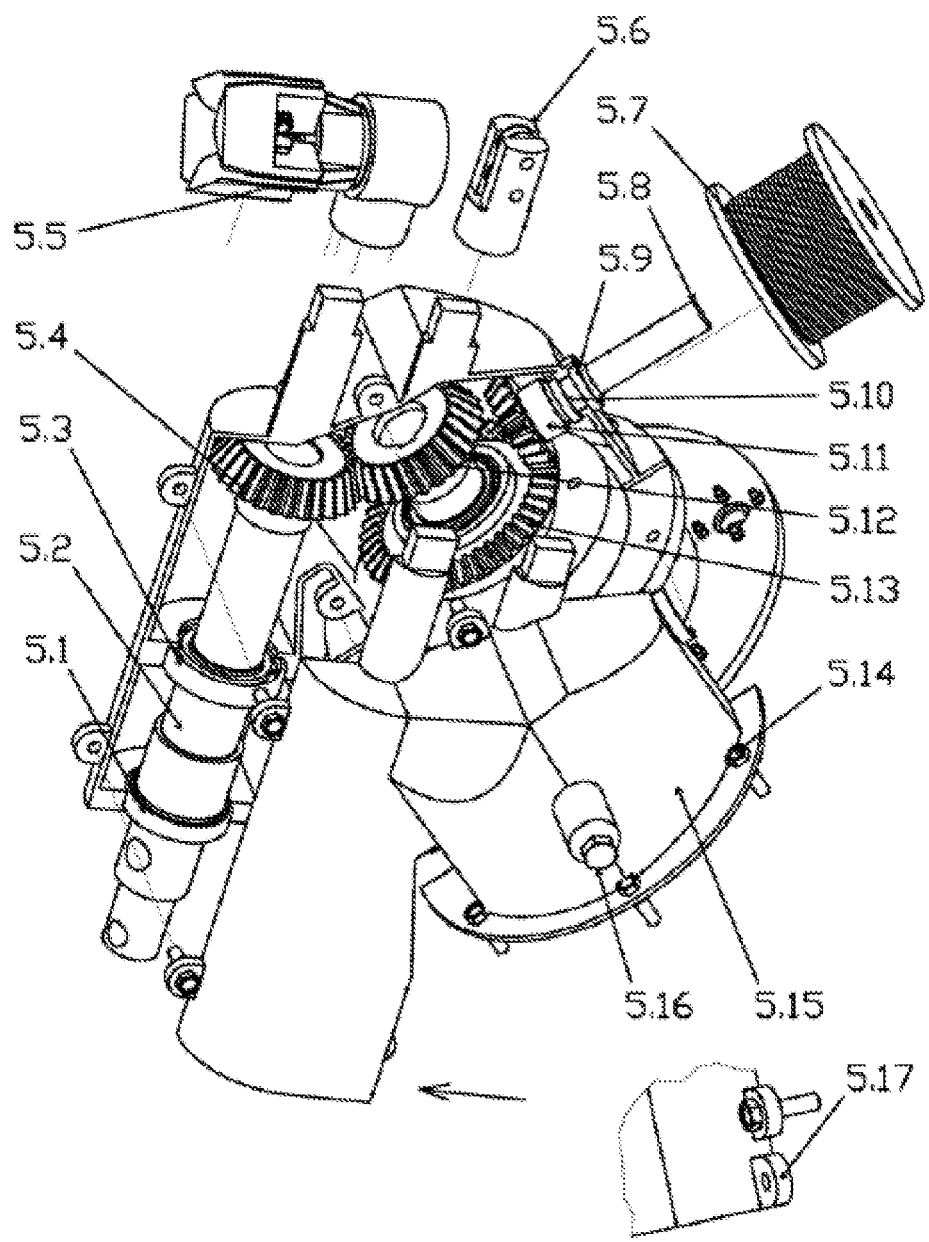
FIG. 8 is a schematic structural diagram of the top gearbox.
Figure 9:
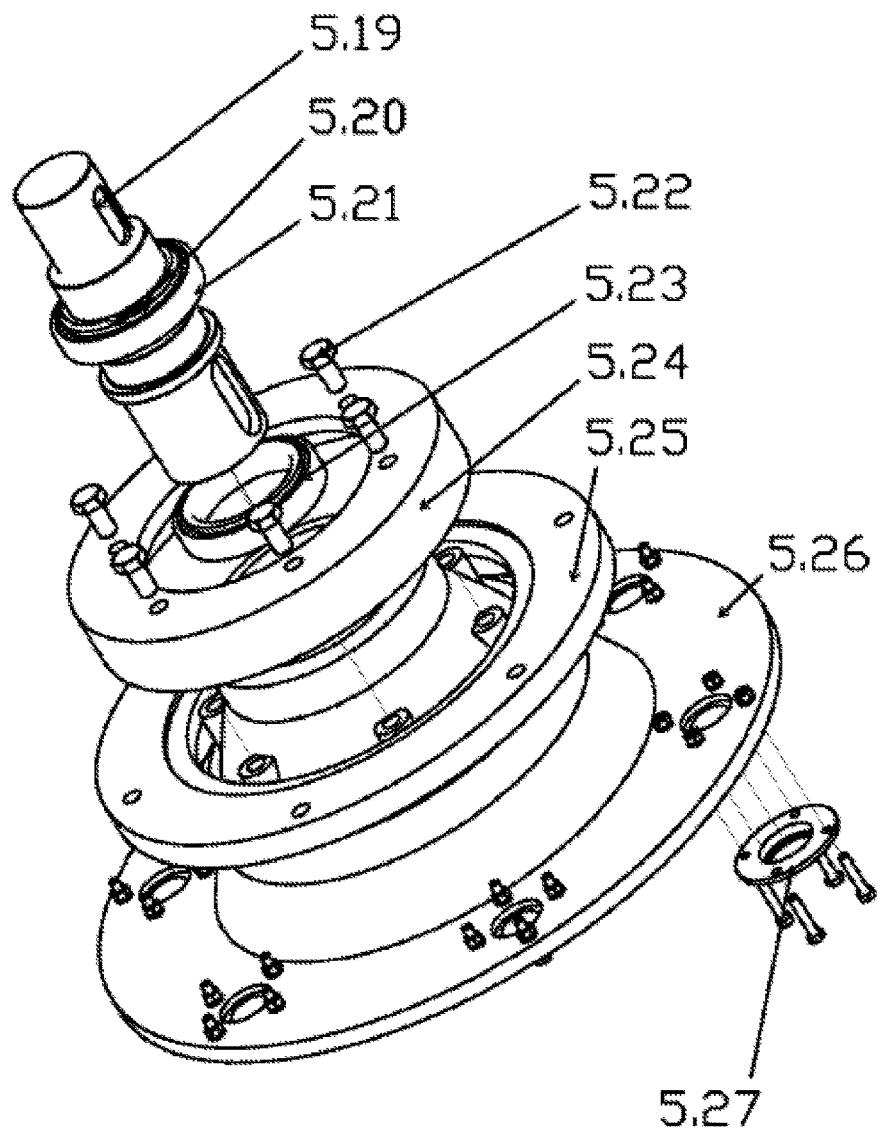
FIG. 9 is an exploded view of the components of the top gearbox part.
Figure 12:
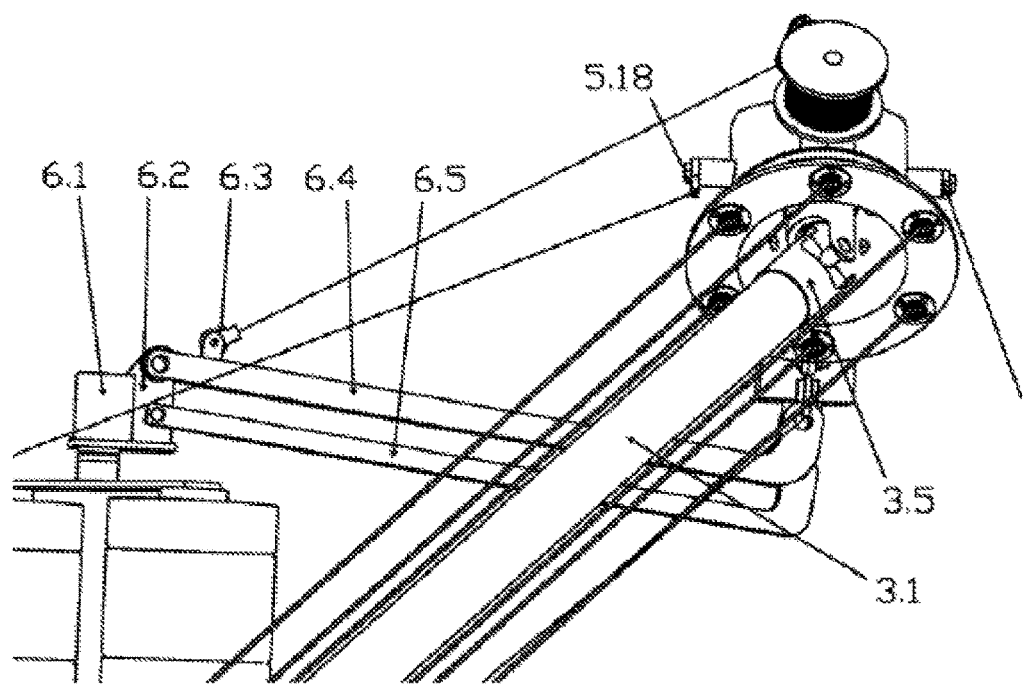
FIG. 12 is a schematic structural diagram of the gib arm.

The top gearbox structure 4 is mounted on the top of the torque transfer mechanism 3, as shown in FIG. 12, one end of the universal coupling II is connected to the intermediate shaft 3.1 with two universal couplings, and the other end of the universal coupling II is connected to the gearbox torque input shaft 5.19, so as to transfer the torque to the gearbox torque input shaft mechanism;

FIGS. 8-11 are diagrams of the gearbox structure. The gearbox structure comprises a gearbox casing 5.15, and a gearbox torque input mechanism, an gearbox upper torque output mechanism, a gearbox lower torque output mechanism in the gearbox casing 5.15, and a steel wire rope guide device 5.5 and a steel wire rope positioning device 5.6;

The gearbox torque input mechanism is mounted on the gearbox casing 5.15, and comprises a gearbox torque input shaft 5.19 and a gearbox torque input disk 5.26, the gearbox torque input shaft 5.19 is fixed in the gearbox torque input disk 5.26 via a shaft check ring C 5.20, a bearing I 5.21, and a bearing J 5.23; the gearbox torque input disk 5.26 is arranged with a bronze wear ring 5.25 and a spacing ring for bronze wear ring 5.24, the spacing ring for bronze wear ring 5.24 is mounted in the gearbox torque input disk 5.26 by spacing ring for bronze wear ring fixing screws 5.22, so as to limit the bronze wear ring 5.25 to the gearbox torque input disk 5.26, leaving only one degree of freedom for the bronze wear ring 5.25 to rotate around the axis of the gearbox torque input disk 5.26; the gearbox casing 5.15 and the bronze wear ring 5.25 are fixedly connected by gearbox casing fixing bolts 5.14, as shown in FIG. 9;

Six steel wire rope knuckle bearings I 3.4 and steel wire rope knuckle bearings II are mounted evenly on the base torque output disk 2.10 and the gearbox torque input disk 5.26 respectively, the steel wire rope knuckle bearings I 3.4 are fixed to the base torque output disk 2.10 via knuckle bearing end caps 2.7, and the knuckle bearing end caps 2.7 are fixed by bearing end cap fixing screws 2.8; a steel wire rope connection clamp 3.6 is arranged in the steel wire rope knuckle bearing I 3.4, and the torque transfer steel wire rope 3.3 is mounted to a steel wire rope end knuckle bearing 3.4 via the steel wire rope connection clamp 3.6; the steel wire rope connection clamp 3.6 is tapered, so that it utilizes deformation to clamp the torque transfer steel wire rope 3.3 automatically; the mounting way of the steel wire rope knuckle bearings II on the gearbox torque input disk 5.26 and the internal setting of the steel wire rope knuckle bearings II are the same as those of the steel wire rope knuckle bearings I 3.4; as shown in FIG. 7, the two ends of six torque transfer steel wire ropes 3.3 are mounted in the steel wire rope knuckle bearings I 3.4 and the steel wire rope knuckle bearings II respectively; when the base torque output disk 2.10 is driven by the driving motor B 2.2 to rotate, the torque transfer steel wire rope 3.3 will rotate along with the base torque output disk 2.10, so that the base external torque output structure transfers the external torque upwards.

The centers of spheres of the steel wire rope knuckle bearings I 3.4 and the steel wire rope knuckle bearings II are in the same plane; in addition, the center points of the universal coupling I and the universal coupling II are in the same plane as the centers of spheres of the steel wire rope knuckle bearings I and the steel wire rope knuckle bearings II respectively, to meet the geometric requirement of the movement of the mechanism.

The gearbox lower torque output mechanism comprises a gearbox lower torque output shaft 5.2 mounted on the top gearbox casing 5.15 via a bearing E 5.1 and a bearing F 5.3, and two through-holes are drilled in the lower part of the gearbox lower torque output shaft 5.2 to mount a forearm 6.4 and an ancillary forearm 6.5;

The gearbox upper torque output mechanism comprises an top gearbox upper torque output shaft 5.8, which is mounted on the top gearbox casing 5.15 via a bearing G 5.9 and a bearing H 5.10; a steel wire reel 5.7 is arranged on the top gearbox upper torque output shaft 5.8;

A bevel gear C 5.12 is mounted on the gearbox torque input shaft 5.19, a bevel gear B 5.11 is mounted on the gearbox upper torque output shaft 5.8, the bevel gear C 5.12 engages with the bevel gear B 5.11, and the torque on the gearbox torque input shaft 5.19 is transferred via the bevel gear C 5.12, the bevel gear B 5.11, and the top gearbox upper torque output shaft 5.8 to the steel wire reel 5.7 to drive the steel wire reel 5.7 to rotate.

A bevel gear D 5.13 is mounted on the gearbox torque input disk 5.26, a bevel gear A 5.4 is mounted on the top gearbox lower torque output shaft 5.2, the bevel gear D 5.13 engages with the bevel gear A 5.4, and the torque on the gearbox torque input disk 5.26 is transferred via the bevel gear D 5.13 and the bevel gear A 5.4 to the top gearbox lower torque output shaft 5.2 to drive the top gearbox lower torque output shaft 5.2 to rotate.

The gearbox casing 5.15 is further arranged with a steel wire rope guide device 5.5, a steel wire rope positioning device 5.6, and three evenly distributed steel wire rope pull rings 6.3.

Figure 10:
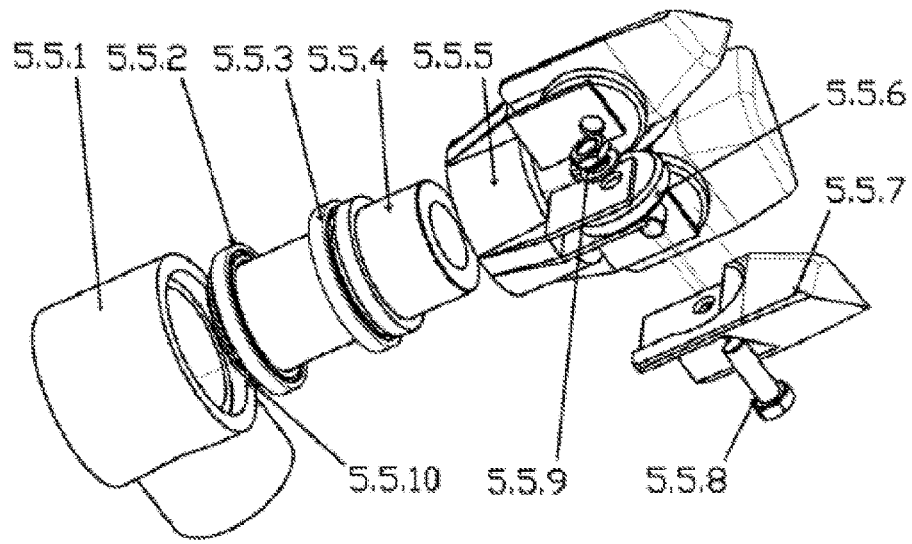
FIG. 10 is an exploded view of the steel wire rope guide device of the top gearbox.

FIG. 10 is an exploded view of the steel wire rope guide device. The steel wire rope guide device comprises a steel wire rope guide device mounting base 5.5.1, a hollow rotating shaft 5.5.4, and a pulley block fixing base 5.5.5, the hollow rotating shaft 5.5.4 is fixed on the steel wire rope guide device mounting base 5.5.1 via a bearing K 5.5.2, a bearing L 5.5.3, and a shaft check ring C 5.5.10, the pulley block fixing base 5.5.5 is mounted on the hollow rotating shaft 5.5.4 and rotates with the hollow rotating shaft 5.5.4, four evenly distributed tangential pulleys A 5.5.6 and steel wire rope limit blocks 5.5.7 are mounted on the pulley block fixing base 5.5.5, the pulleys A 5.5.6 and the steel wire rope limit blocks 5.5.7 are mounted on the pulley block fixing base 5.5.5 via pulley fixing bolts 5.5.8, nuts and washers 5.5.9, the rope groove of each pulley A among the four tangential pulleys A 5.5.6 is a quadrant, the steel wire rope limit blocks 5.5.7 can limit the steel wire rope; when the angle of the steel wire rope is changed, the steel wire rope will apply force on the steel wire rope limit blocks 5.5.7 to poke the steel wire rope limit blocks 5.5.7, so that the hollow rotating shaft 5.5.4 rotates and the angles of the pulleys A 5.5.6 are adjusted to keep consistent with the direction of the steel wire rope.

Figure 11:
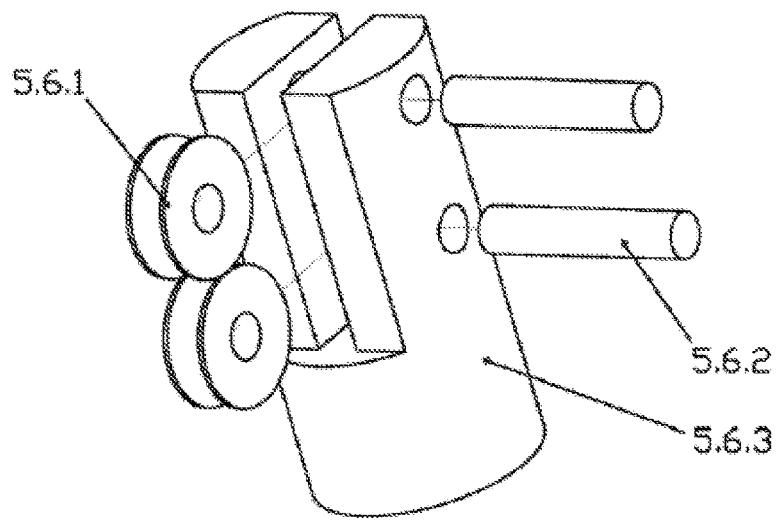
FIG. 11 is an exploded view of the top steel wire rope positioning device.

FIG. 11 is an exploded view of the top steel wire rope positioning device. The two pulleys B 5.6.1 are fixed to a steel wire rope positioner mounting base 5.6.3 by pulley fixing pins 5.6.2, and the rope groove of the pulley B 5.6.1 is a half circle.

FIG. 12 is a schematic structural diagram of the gib arm. The gib arm comprises a forearm 6.4 and an ancillary forearm 6.5, the rear ends of the forearm 6.4 and the ancillary forearm 6.5 are mounted on the lower part of the top gearbox lower torque output shaft 5.2, a wrist driving motor mounting platform 6.2 is mounted on the front ends of the forearm 6.4 and the ancillary forearm 6.5, and a wrist driving motor 6 is mounted on the wrist driving motor mounting platform 6.2; the forearm 6.4, the ancillary forearm 6.5, and the wrist driving motor mounting platform form a parallelogram, so as to maintain the attitude of the wrist; the driving motor drives mechanical arm end tools 7 to operate the work object 8; the front end of the forearm 6.4 is connected with the steel wire rope, the other end of the steel wire rope passes through a round hole formed by the four tangential pulleys A 5.5.6 on the steel wire rope guide device 5.5 and passes through the hollow rotating shaft 5.5.4, and then passes through a round hole formed by the rope groove of a pulley B 5.6.1, and finally is reeled on the steel wire reel 5.7; thus, the gib arm is driven to sway up and down as the steel wire rope is stretched or retracted;

After passing through the torque input disk 2.16 of the top gearbox 4, the torque transfer steel wire rope passes through the steel wire rope pull rings 6.3 on the top gearbox, and finally is connected to the steel wire rope driver 1 mounted on the chassis.

We claim:

1. A combined rope-rod-driven parallel palletizing robot, comprising:
   a base driving mechanism arranged on a chassis, the base mechanism comprising a base-driving internal torque structure and a base-driving external torque structure, wherein the base-driving internal torque structure and a base-driving external torque structure are driven by a plurality driving motors to generate torque internally and externally respectively;
   a torque transfer mechanism mounted on the base driving mechanism, the torque transfer mechanism comprising an external torque transfer mechanism and an internal torque transfer mechanism,
   the external torque transfer mechanism, including six steel transfer wire ropes, transferring a first torque from a base torque output disk to a top gearbox mounted on the top of the torque transfer mechanism;
   an internal torque transfer mechanism transferring a second torque from a base internal torque transfer shaft affixed to the torque transfer mechanism to the a gearbox on a gib arm; wherein the first and second torque is converted by the top gearbox to drive the gib arm to rotate and lift;
   the gib arm, movably connected to the top gearbox, comprising
   a forearm mounted on the lower part of a top gearbox lower torque output shaft extending from the top gearbox;
   a movable end comprising a mechanical arm end tool arranged on the movable end of the gib arm and configured to operate a work object;
   three steel wire rope drivers located on the chassis and arranged evenly around the base driving mechanism, with three steel outer wire ropes corresponding to each of the three steel wire rope drivers;
   wherein when the robot is driven such that the combined rope-rod-driven parallel palletizing robot performs handling and palletizing actions.

2. The combined rope-rod-driven parallel palletizing robot according to claim 1, wherein, the base driving mechanism further comprising:
   a base internal torque output shaft arranged above a base, mounted with a first gear thereon and is operably connected to a first driving motor,
   a second gear arranged on the output shaft of the first driving motor such that the second gear is engaged with the first gear, wherein the first driving motor drives the base internal torque output shaft via the second gear and the first gear; and
   a base external torque transfer shaft, arranged below the base, including an upper part of the base external torque transfer shaft being fixed in the base and further including with a third gear mounted thereon operably coupled to a second driving motor mounted on one side of the base,
   a base torque output disk fixedly mounted below the base external torque transfer shaft;
   a fourth gear arranged on the output shaft of the second driving motor such that the fourth gear is engaged with the third gear, wherein the second driving motor drives the base external torque output shaft via the fourth gear and the third gear, and the base external torque transfer shaft in turn drives the base torque output disk mounted below;
   wherein a lower part of the base internal torque output shaft is fixed to the base external torque transfer shaft; and the base internal torque output shaft and the base external torque output shaft rotate coaxially and independently without interference between them;
   wherein the angle between the axes of the base internal torque output shaft and the base external torque output shaft of the base driving mechanism and horizontal plane are 45°, so as to maximize the utilization of the work space according to the working environment for conventional handling and palletizing work.

3. The combined rope-rod-driven parallel palletizing robot according to claim 2, wherein, six steel wire rope knuckle bearings in a first group and a second group are mounted evenly on the base torque output disk and the gearbox torque input disk respectively; and
   wherein the first group of steel wire rope knuckle bearings are fixed to the base torque output disk via knuckle bearing end caps, the knuckle bearing end caps are fixed by bearing end cap fixing screws;
   wherein a steel wire rope connection clamp are arranged in the first group of steel wire rope knuckle bearing, the steel wire rope connection clamp is tapered and configured to use deformation to clamp a torque transfer steel wire rope automatically;
   wherein the torque transfer steel wire rope are mounted to a steel wire rope end knuckle bearing via the steel wire rope connection clamp;
   wherein the mounting way of the second group of steel wire rope knuckle bearings on the gearbox torque input disk and the internal setting of the second group of steel wire rope knuckle bearings are the same as those of the first group of steel wire rope knuckle bearings;
   wherein the two ends of six torque transfer steel wire ropes are mounted into the first and second groups of steel wire rope knuckle bearings respectively;
   wherein when the base torque output disk is driven by the driving motor to rotate, the torque transfer steel wire rope rotates along with the base torque output disk, so as to accomplish upward transfer of the external torque.

4. The combined rope-rod-driven parallel palletizing robot according to claim 3, wherein a center of a sphere in each of the first and second groups of steel wire rope knuckle bearings is located in the same plane and each sphere is configured to keep the torque transfer steel wire rope in vertical state; and
   wherein the center points of the first universal coupling and the second universal coupling are in the same plane as the centers of spheres of the first and second groups of steel wire rope knuckle bearings respectively, to meet the geometric requirements of the movement of the mechanism.

5. The combined rope-rod-driven parallel palletizing robot according to claim 1, wherein, the torque transfer mechanism further comprising:

an intermediate shaft with two universal couplings, a first universal coupling and a second universal coupling, each with two ends, the first and second universal couplings being arranged at one end on the lower part and upper part of the intermediate shaft respectively;

wherein the other end of the lower, first universal coupling is connected to the base internal torque transfer shaft;

wherein the other end of the upper, second universal coupling is connected to a torque input shaft of the top gearbox configured to transfer the internal torque of the base internal torque transfer shaft upwards along the intermediate shaft.

6. The combined rope-rod-driven parallel palletizing robot according to claim 1, wherein, the top gearbox further comprises
   a gearbox casing;
   a gearbox torque input mechanism arranged in the gearbox casing, further including a gearbox torque input shaft fixed in a gearbox torque input disk;
   the gearbox torque input disk arranged with a bronze wear ring and a spacing ring limiting the bronze wear ring to the gearbox torque input disk, wherein the bronze wear ring is fixedly connected the gearbox casing leaving only one degree of freedom for the bronze wear ring to rotate around the axis of the gearbox torque input disk;
   a gearbox lower torque output mechanism comprises a gearbox lower torque output shaft including two through-holes are drilled in a lower part of the gearbox lower torque output shaft to mount a forearm and an ancillary forearm;
   a gearbox upper torque output mechanism comprises a gearbox upper torque output shaft, which is arranged with a steel wire reel thereon;
   a first bevel gear is mounted on the top gearbox lower torque output shaft,
   a second bevel gear mounted on the gearbox upper torque output shaft;
   a third bevel gear mounted on the gearbox torque input shaft and engaged with the second bevel gear, wherein the torque on the gearbox torque input shaft is transferred via the third bevel gear, the second bevel gear, and the top gearbox upper torque output shaft into the steel wire reel to drive the steel wire reel to rotate;
   a fourth bevel gear mounted on the gearbox torque input disk and engaged with the first bevel gear, wherein the torque on the gearbox torque input disk is transferred via the fourth bevel gear and the first bevel gear into the top gearbox lower torque output shaft configured to drive the top gearbox lower torque output shaft to rotate.

7. The combined rope-rod-driven parallel palletizing robot according to claim 1, wherein the gearbox casing is further comprising:
   a steel wire rope guide device comprising
      a steel wire rope guide device mounting base connected by a steel wire rope with a steel wire rope positioning device, the steel wire rope mounting base further including three evenly distributed steel wire rope pull rings;
      a hollow rotating shaft rotatably fixed on the steel wire rope guide device mounting base, and
      a pulley block fixing base mounted on the hollow rotating shaft and rotating along with the hollow rotating shaft, the pulley block fixing base further including four evenly distributed tangential pulleys and steel wire rope limit blocks mounted on the pulley block fixing base via pulley fixing bolts, nuts and washers, wherein the rope groove of each pulley among the four tangential pulleys is arranged in a quadrant of the pully block fixing base;
   wherein when the angle of the steel wire rope is changed, the steel wire rope applies force on the steel wire rope limit blocks, so that the hollow rotating shaft rotates and the angles of the pulleys are consistent with the direction of the steel wire rope.

8. The combined rope-rod-driven parallel palletizing robot according to claim 1, wherein, the gib arm further comprises
   an ancillary forearm mounted on the lower part of a top gearbox lower torque output shaft with a lower part, the lower torque output shaft extending from the top gearbox;
   wherein the rear ends of both the forearm and the ancillary forearm are mounted on the lower part of the top gearbox lower torque output shaft,
   a wrist driving motor mounted on a wrist driving motor mounting platform positioned on a front ends of the forearm and on a front ends of the ancillary forearm;
   wherein the front end of the forearm is connected with a forearm steel wire rope to a steel wire reel, and the forearm steel wire rope passes through a round hole formed by four tangential pulleys, through a hollow rotating shaft, and through a round hole formed by the rope groove of a secondary pulley;
   wherein the forearm, the ancillary forearm, and the wrist driving motor mounting platform form a parallelogram, so as to maintain the attitude of the wrist; and
   wherein the gib arm is driven to sway up and down as the forearm steel wire rope is stretched or retracted respectively by one of the three steel wire rope drivers.

* * * * *